United States Patent
Guthrie et al.

(10) Patent No.: US 7,284,102 B2
(45) Date of Patent: Oct. 16, 2007

(54) SYSTEM AND METHOD OF RE-ORDERING STORE OPERATIONS WITHIN A PROCESSOR

(75) Inventors: Guy Lynn Guthrie, Austin, TX (US); Hugh Shen, Austin, TX (US); William John Starke, Round Rock, TX (US); Derek Edward Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 11/054,450

(22) Filed: Feb. 9, 2005

(65) Prior Publication Data

US 2006/0179226 A1 Aug. 10, 2006

(51) Int. Cl.
*G06F 12/00* (2006.01)
(52) U.S. Cl. ......................................... 711/158; 710/40
(58) Field of Classification Search ................. 711/158; 710/140, 40
See application file for complete search history.

(56) References Cited

U.S. PATENT DOCUMENTS

2004/0111594 A1* 6/2004 Feiste et al. ................. 712/245
2006/0129764 A1* 6/2006 Bellows et al. .............. 711/125

* cited by examiner

*Primary Examiner*—Hiep T. Nguyen
(74) *Attorney, Agent, or Firm*—Diana R. Gerhardt; Dillon & Yudell LLP

(57) ABSTRACT

A system and method for re-ordering store operations from a processor core to a store queue. When a store queue receives a new processor-issued store operation from the processor core, a store queue controller allocates a new entry in the store queue. In response to allocating the new entry in the store queue, the store queue controller determines whether or not the new entry is dependent on at least one other valid entry in the store queue. In response to determining the new entry is dependent on at least one other valid entry in the store queue, the store queue controller inhibits requesting of the new entry to the RC dispatch logic until each valid entry on which the new entry is dependent has been successfully dispatched to an RC machine by the RC dispatch logic.

20 Claims, 8 Drawing Sheets

SYSTEM AND METHOD OF RE-ORDERING STORE OPERATIONS WITHIN A PROCESSOR

BACKGROUND OF THE INVENTION

1. Technical Field

The present invention relates generally to data processing systems and specifically to processing store operations within a processor chip. Still more particularly, the present invention relates to an improved system and method of reordering store operations within a processor chip for more efficient processing.

2. Description of the Related Art

Increasing efficiency of data operation at the processor-cache level is an important aspect of processor chip development. Modern microprocessors typically include entire storage hierarchies (caches) integrated into a single integrated circuit. For example, one or more processor cores containing L1 instruction and/or data caches are often combined with a shared on-chip L2 cache.

In systems with on-chip caches, processor issued data store operations typically target only a small portion (i.e., 1-byte to 16-bytes) of a cache line compared to the entire cache line (e.g., typically 128-bytes). For example, it is possible for a processor-issued store operation to target only a single byte granule of a 128-byte cache line to update, and cache line updates are completed via a combination of these individual store operations, which may occur sequentially. In order to increase efficiency, processor chips are often designed with a "store queue" that is typically placed between a processor core and the L2 cache. A store queue typically contains byte-addressable storage for a number of cache lines (usually 8 to 16 cache lines).

FIG. 2 illustrates a prior art representation of specific hardware and logic components of a processor chip that are utilized to complete data store operations. As illustrated, processor chip 201 includes a processor core 203, store queue 207 with store queue (STQ) controller 205, and read-claim (RC) dispatch logic 219. STQ controller 205 includes write pointer 204 and read pointer 206 for selecting entries within store queue 207. The operation of both write pointer 204 and read pointer 206 are discussed herein in more detail in conjunction with FIGS. 3A and 3B. RC dispatch logic 219 supports a series of RC machines 221, which complete the actual data store operations at the lower-level cache (not shown).

Store queue 207 provides several rows (entries) for temporarily storing and tracking processor-issued stores. Each row is divided into several columns that provide byte enable register 209, address register 211, data register 213, controls bits 215, and valid bit 217. Data register 213 and address register 211 store data issued from processor core 203 and the corresponding data (memory address), respectively. Byte enable register 209 includes a number of bookkeeping bits. Conventionally, the number of bits corresponds to the number of individually addressable storage granules within a cache line. Thus, for example, for a 128-byte cache line entry and byte store operations, byte enable register 209 maintains 128 bits for tracking single-byte processor-issued stores. This enables tracking of specific bytes (or group of bytes) within a 128-byte cache line entry that is being updated by processor core 203.

Valid bit 217 indicates to STQ controller 205 when data within a particular row of store queue 207 is valid, and valid bit 217 is checked before a row of data (or an entry) is forwarded to RC dispatch logic 219. Once a valid bit is set, the row of data (or an entry) is selectable regardless of whether additional stores to that cache line are being sent by processor core 203. Control bits 215 represent an assortment of additional bits that are utilized by STQ controller 205. The functionality of several of the above-described columns is referenced within the description of the data store operations below.

Store operations typically originate at processor core 203 and are temporarily stored in an entry of store queue 207. The store operations target a particular cache line (or portion of the cache line) identified by the address within the store operation, and the operation also provides data to be stored within the addressed portion of that cache line (e.g., byte 12).

The store operations update particular bytes within the cache line entry. Concurrent with these data updates, corresponding bits within byte enable register 209 are set to track which bytes within the cache line entry have been updated by store operations. Typically, a series of store operations writing to a same entry in the store queue are absorbed by the store queue entry before the line is dispatched to the L2 cache. This absorption of multiple store operations into a single entry is referred to as "gathering" stores, since multiple different stores addressing the same cache line are "gathered" into an entry of the store queue buffer before the line is presented to the L2 cache for storage.

FIG. 3A is a high-level logical flow chart illustrating the operation of write pointer 204 as implemented within STQ controller 205 during a store operation in accordance with the prior art. The process begins at step 300 and continues to step 304, which depicts processor core 203 issuing a store operation to store queue 207. However, if STQ controller 205 determines that store queue 207 is full, STQ controller 205 sends a message instructing processor core 203 to halt the sending of store operations until some entries have been dispatched by RC dispatch logic 219.

The process then continues to step 306, which illustrates STQ controller 205 determining whether or not a gatherable entry is available. As referenced above, a "gatherable" entry is a single entry in which multiple store operations may be absorbed into that single entry before the entry is presented to the L2 cache for storage. If STQ controller 205 determines that a gatherable entry is available, the process continues to step 307, which depicts the store operations being gathered into an existing entry Returning to step 306, if STQ controller 205 determines that a gatherable entry is not available, the store operation is allocated at the location defined by the current position of write pointer 204, as illustrated in step 308. The process then continues to step 310, which illustrates STQ controller 205 incrementing write pointer 204 to the next entry in store queue 207. The process then returns to step 304 and proceeds in an iterative fashion.

FIG. 3B is a high-level logical flowchart depicting the operation of read pointer 306 as implemented within STQ controller 205 when dispatching store operations to RC dispatch 219 in accordance with the prior art. The process begins at step 350 and proceeds to step 352, which illustrates STQ controller 205 determining if write pointer 204 is pointing to the same entry in store queue 207 as read pointer 206. If STQ controller 205 determines that write pointer 204 is pointing to the same entry in store queue 207 as read pointer 207, the process continues to step 354, which depicts STQ controller 205 determining if the entry is valid. If the entry is not valid, this indicates to STQ controller 205 that store queue 207 is empty and there are no valid entries available for dispatch to RC dispatch 219. Therefore, if STQ controller 205 determines that the entry is not valid, the process returns to step 352 and continues in an iterative fashion.

However, if STQ controller 205 determines that the entry is valid, the process then continues to step 356, which illustrates store queue 207 attempting a dispatch of the entry to RC machines 221. Returning to step 352, if STQ controller 205 determines that write pointer 204 is not pointing at the same entry in store queue 207 as read pointer 206, the process also continues to step 356. The process then continues to step 358, which depicts STQ controller 205 determining whether or not the dispatch of the entry was successful. At the completion of a successful dispatch, RC dispatch logic 219 sends a "dispatch complete" signal back to STQ controller 205. If STQ controller 205 receives a "dispatch complete" signal from RC dispatch logic 219, the process continues to step 360, which illustrates STQ controller 205 moving read pointer 206 to the next entry in store queue 207. Then, the process returns to step 352 and continues in an iterative fashion. Returning to step 358, if STQ controller 205 does not receive a "dispatch complete" signal from RC dispatch logic, the process returns to step 356 and continues in an iterative fashion.

Those skilled in this art will appreciate that the dispatch of store queue entries to RC machines can often be stalled by RC machines already working on the same address or snoop machines servicing requests from other processors. New RC machines typically cannot dispatch on the same address as another RC or snoop machine. The store queue will continue to iterate on the same entry until the entry is successfully dispatched, as indicated in steps 356 and 358 of FIG. 3B. This iterative loop can expend hundreds of cycles as the RC machine could be working to retrieve the requested cache line from main memory. The delayed dispatch of store queue entries to the RC machines can eventually result in a backup of the store pipe in the processor core, which could result in a stall of the entire processor. Therefore, the first-in-first-out (FIFO) nature of store queue 207 will not allow the dispatch of other store queue entries until out (FIFO) nature of store queue 207 will not allow the dispatch of other store queue entries until the current store queue entry referenced by read pointer 206 is dispatched.

The present invention recognizes the benefits of providing a more efficient dispatch of entries from a store queue to associated RC dispatch logic. This invention further recognizes that it would be desirable to provide a system and method for re-ordering dispatch requests for entries within a store queue to reduce the likelihood for the store queue to iterate on an entry while waiting for the entry to be successfully dispatched by the RC dispatch logic. These and other benefits are provided by the invention described herein.

SUMMARY OF THE INVENTION

A system and method for re-ordering store operations from a processor core to a store queue is disclosed. When a store queue receives a new processor-issued store operation from the processor core, a store queue controller allocates a new entry in the store queue. In response to allocating the new entry in the store queue, the store queue controller determines whether or not the new entry is dependent on at least one other valid entry in the store queue. In response to determining the new entry is dependent on at least one other valid entry in the store queue, the store queue controller inhibits requesting of the new entry to the RC dispatch logic until each valid entry on which the new entry is dependent has been successfully dispatched to an RC machine by the RC dispatch logic.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

The present invention provides a method and a processor-chip design/configuration by which certain store operations may bypass other store operations that are stalled and unable to dispatch to an RC machine due to address collisions with other RC or snoop machines. The invention enables more efficient processing of store queue entries to reduce the likelihood of processor stalls resulting from a backlog of store queue entries. The invention involves some enhancements and/or additions to the store queue mechanism, including a dependency matrix and changes in the STQ controller to prevent repeated selection of an entry by the arbitration logic while the attempted dispatch of that particular entry might result in stalling other store operations.

Figure 1:
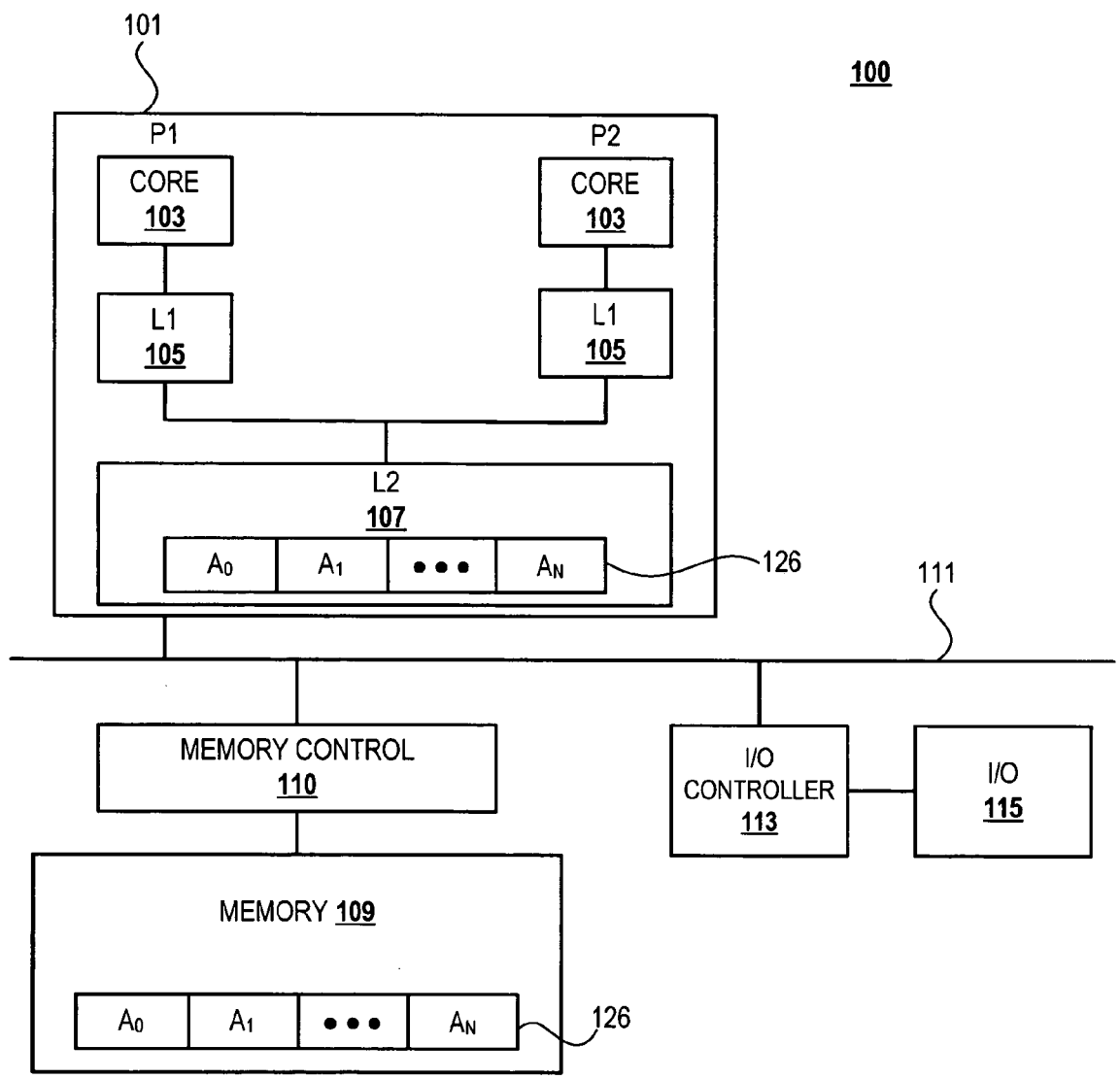
FIG. 1 is a block diagram illustrating a multi-processor data processing system within which the various features of the invention may advantageously be completed.

With reference now to the figures and in particular, with reference to FIG. 1, there is illustrated a multi-processor data processing system (MP) 100. MP 100 comprises several major components including processor chips 101, memory 109 and I/O device(s) 115. I/O device(s) 115 have an associated I/O controller 113, with memory 109 has an associated memory controller 110 that controls access to and from memory 109.

Processor chips 101 are connected to memory 109 and I/O devices 115 via interconnect (system bus) 111 by which processor chips 101 communicate with each other and with memory 109, I/O devices 115, and other peripheral devices. Interconnect 111 is a bifurcated bus with a data bus for routing data and a separate address bus for routing address transactions and other operations.

Processor chips 101 each contain two processor cores 103, and onboard L1 caches 105 and shared L2 cache 107. According to the present invention, L2 caches 107 support intervention. Further, each cache is designed with a cache directory, an array of cache lines, and all data operations at each cache are completed according to a coherency protocol, such as a MESI coherency protocol.

The various features of the invention are carried out by logic components on processor chips 101 and affect buffering of store operations at the store queue and selection of entries for dispatch. For illustrative purposes, a sample cache line is provided within L2 cache, and the invention is described from the perspective of updating a cache line (A) in the L2 cache with store operations issued by a processor core and temporarily buffered in a store queue entry. As illustrated within L2 cache 107 of FIG. 1, exemplary cache line A 126 may contain multiple blocks/granules of data, corresponding to individual bytes, words, double words, etc., each of which may be the target of an update by a processor-issued store operation. The specific size of each cache line 126 and number of updateable data blocks/granules may differ from system to system, and the exact parameters utilized within the invention are adjusted accordingly to provide the general functionality described herein. While the present invention is described with specific reference to the L2 cache within a multi-level cache architecture, it is understood that the cache architecture need not be a multi-level one.

The present invention is described with reference to MP 100 and component parts of MP 100 illustrated by FIG. 1 and FIG. 4 (described below), but the present invention may be applied to different configurations of data processing systems that are not necessarily conventional. As an example, the invention may be implemented within a non-uniform memory access (NUMA) system, wherein the system memory (RAM) is divided among two or more memory arrays (having separate memory controllers connected to the system bus) and allocated among the processing units. Also, MP 100 could include new hardware components not shown in FIG. 1, or have a novel interconnect architecture for existing components. MP 100 may also have a different number of processing units. Those skilled in the art will therefore appreciated that the present invention is not limited to the generalized system showing in FIG. 1.

Figure 4:
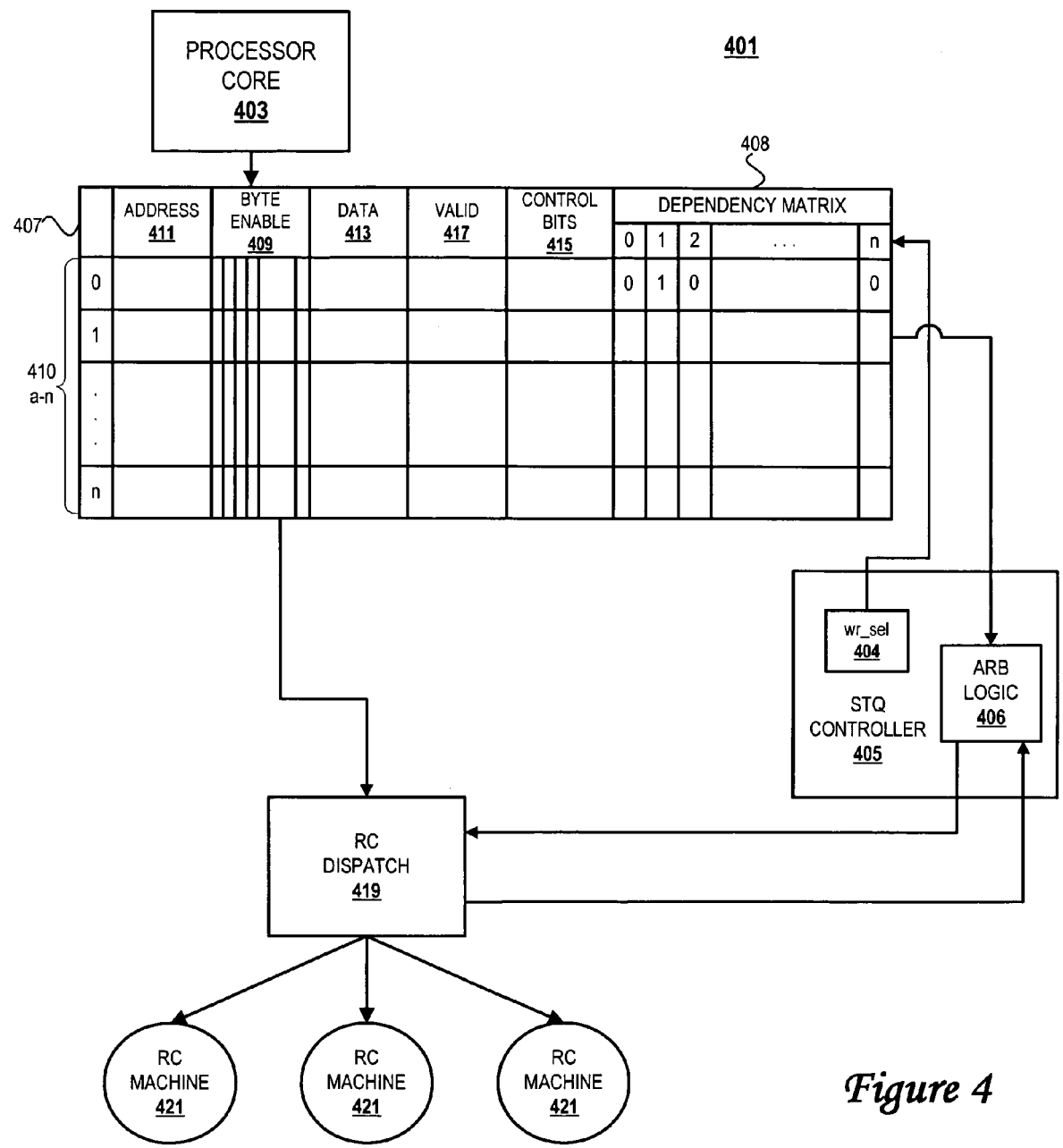
FIG. 4 is a block diagram representing processor components utilized to complete a store operation to an on-chip cache according to a preferred embodiment of the present invention.

While the invention is practiced within the general data processing system 100 of FIG. 1, the particular implementation features of the invention are provided within the store queue and associated components of the processor chip, as exemplified by FIG. 4. Implementation of the invention requires certain enhancements to the store queue and STQ controller.

Figure 2:
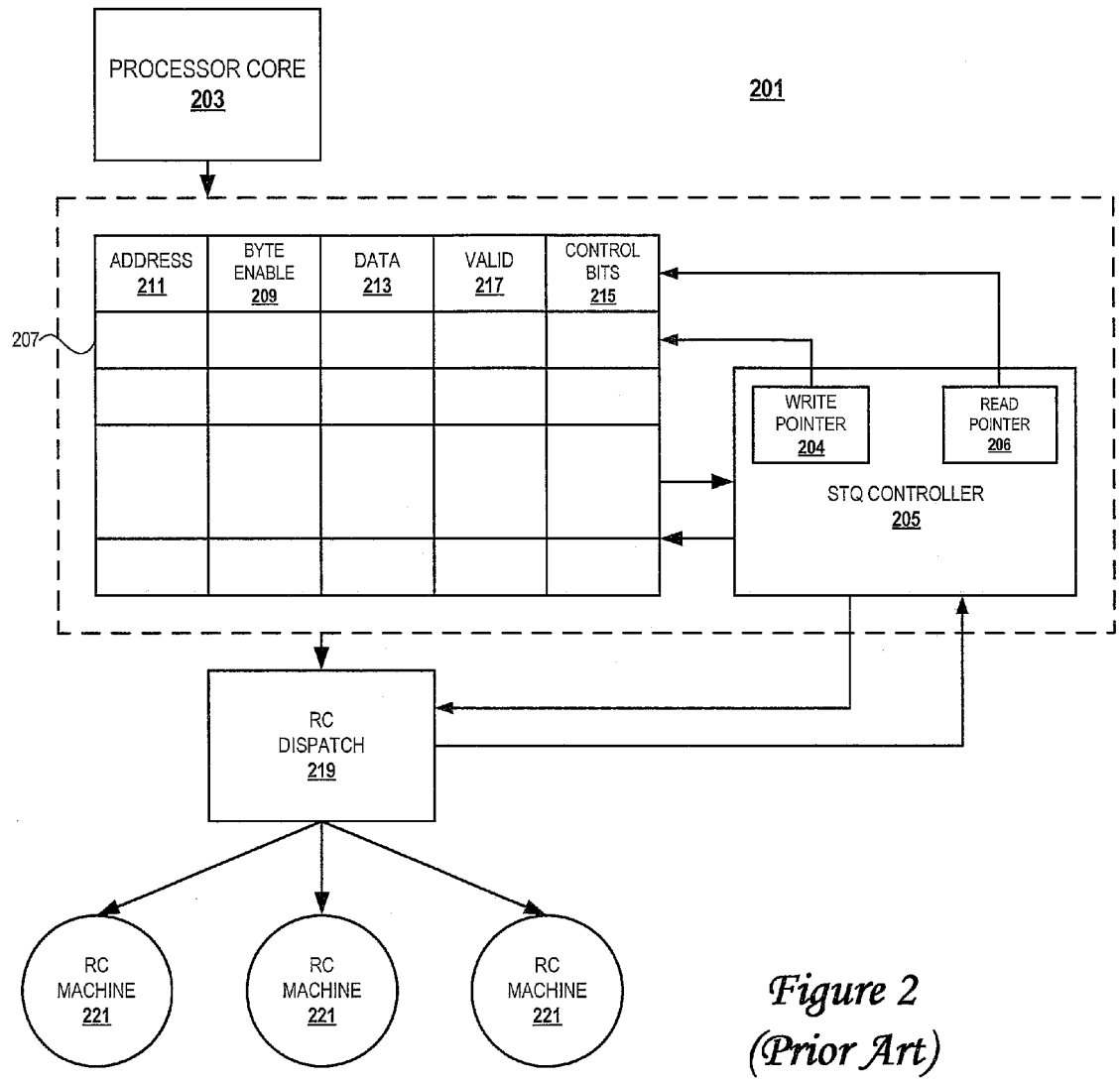
FIG. 2 is a prior art representation of processor components utilized to complete a store operation to an on-chip cache.
Figure 3A:
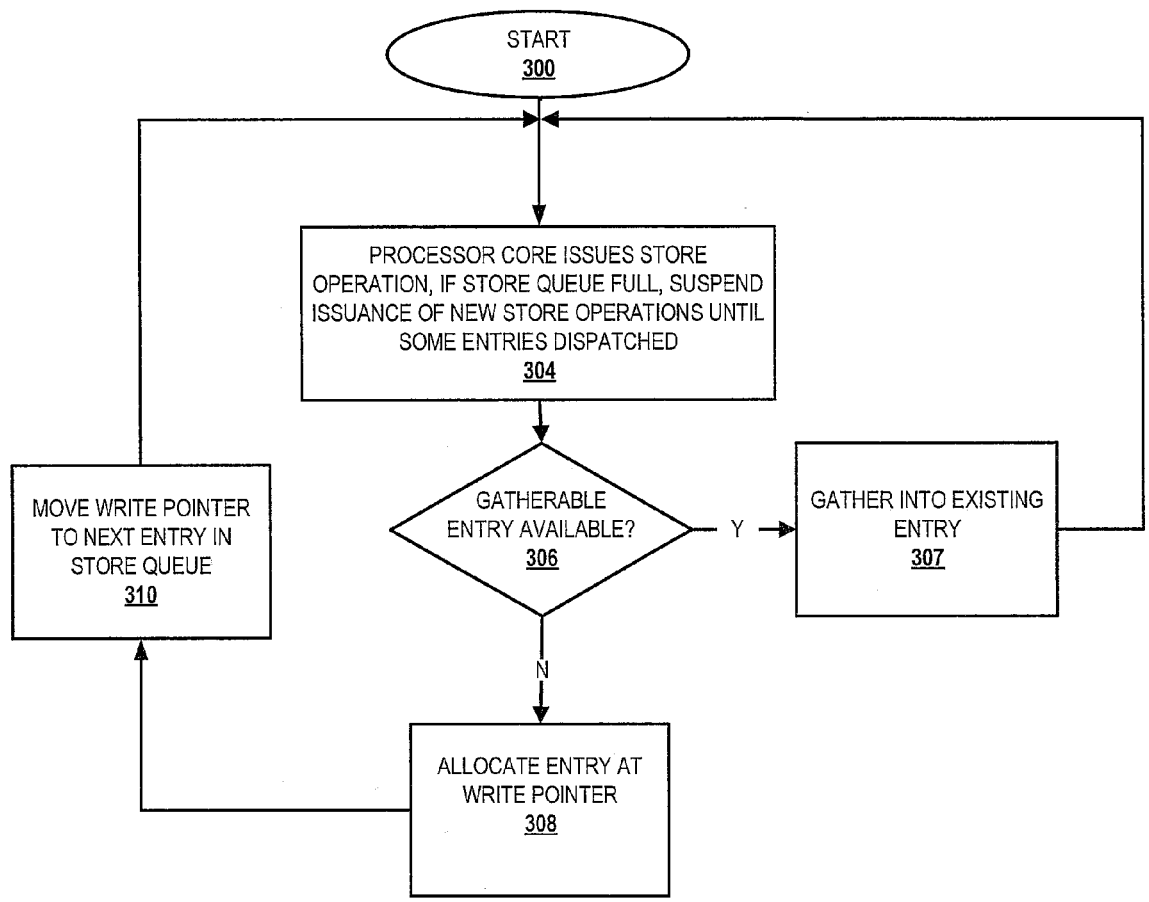
FIG. 3A is a high-level flowchart diagram illustrating the process of storing data to an entry of a store queue according to prior art.
Figure 3B:
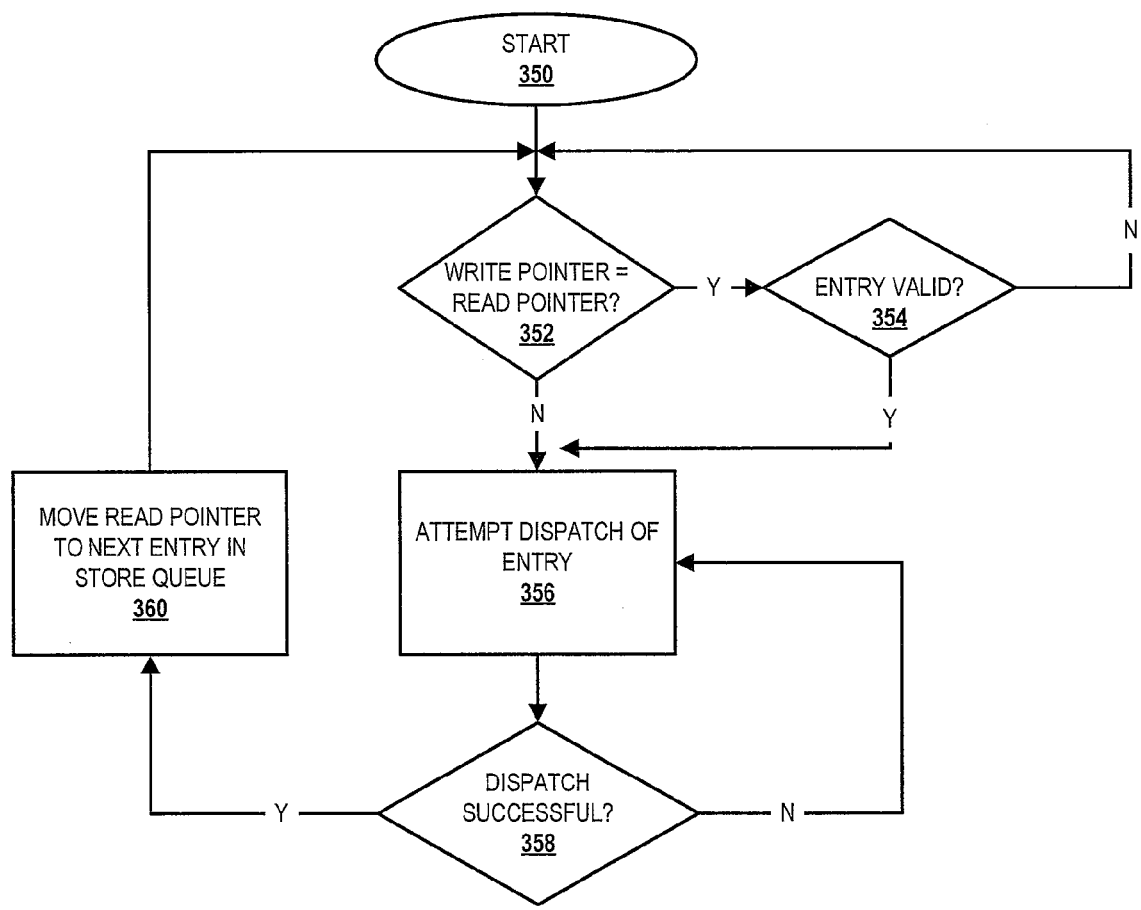
FIG. 3B is a high-level flowchart diagram depicting the interaction between a store queue and RC dispatch logic when clearing entries from the store queue.

Unlike the prior art configuration of FIG. 2, several enhancements are provided with the design of processor chip 401, particularly store queue 407, and STQ controller 405. Among these enhancements are additional logic components that: (1) tracks dependencies among the entries; (2) inhibits the attempted dispatch of a first entry before all other entries the first entry is dependent on have been processed by associated RC logic; and (3) signals that the entry is ready for dispatch once all dependencies are cleared.

With specific reference to FIG. 4, there is illustrated a store queue mechanism with store queue 407 that includes the standard registers for storing information, namely address register 411, data register 413, control bits 415, valid bit 417, byte enable register 409, and a collection of entries 410*a-n*. As shown, byte enable register 409 contains a number of bits, each corresponding to a smallest size of store granule within data register 413. For simplicity, the present invention will be described with cache lines having a length/capacity of 128-bytes that are updated via a plurality of processor-issued store operations.

Store queue 407 also includes a dependency matrix 408 consisting of n-by-n bits. Each row represents each store queue entry's dependencies on other store queue entries. A "1" in a row indicates that the entry corresponding to that row cannot be dispatched until the entry corresponding to the column with the "1" has already dispatched. For example, as depicted in FIG. 4, store queue entry 0 is dependent on store queue entry 1, and store queue entry 0 cannot be dispatched before store queue entry 1 has been cleared for dispatch.

STQ controller 405 includes a write select pointer 404 and arbitration logic 406. Write select pointer 404 selects empty entries to hold new store operations when processor core 403 sends new store operations to store queue 407 that do not gather into an existing entry. While those skilled in this art will appreciate that write select pointer 404 can utilize any appropriate algorithm to select an empty store queue entry, such as with a priority encode algorithm that enables write select pointer 404 to select an empty entry from any entry with a valid bit set to "0" (indicating an entry that may be overwritten). Arbitration logic 406 examines store queue 407 for eligible entries to send to RC dispatch logic 419 for dispatch to RC machines 421. A store queue entry 410*a-n* is eligible for transmission to RC dispatch logic 419 when the dependency matrix row corresponding to the particular store queue entry indicates that all dependencies are cleared out.

Figure 5:
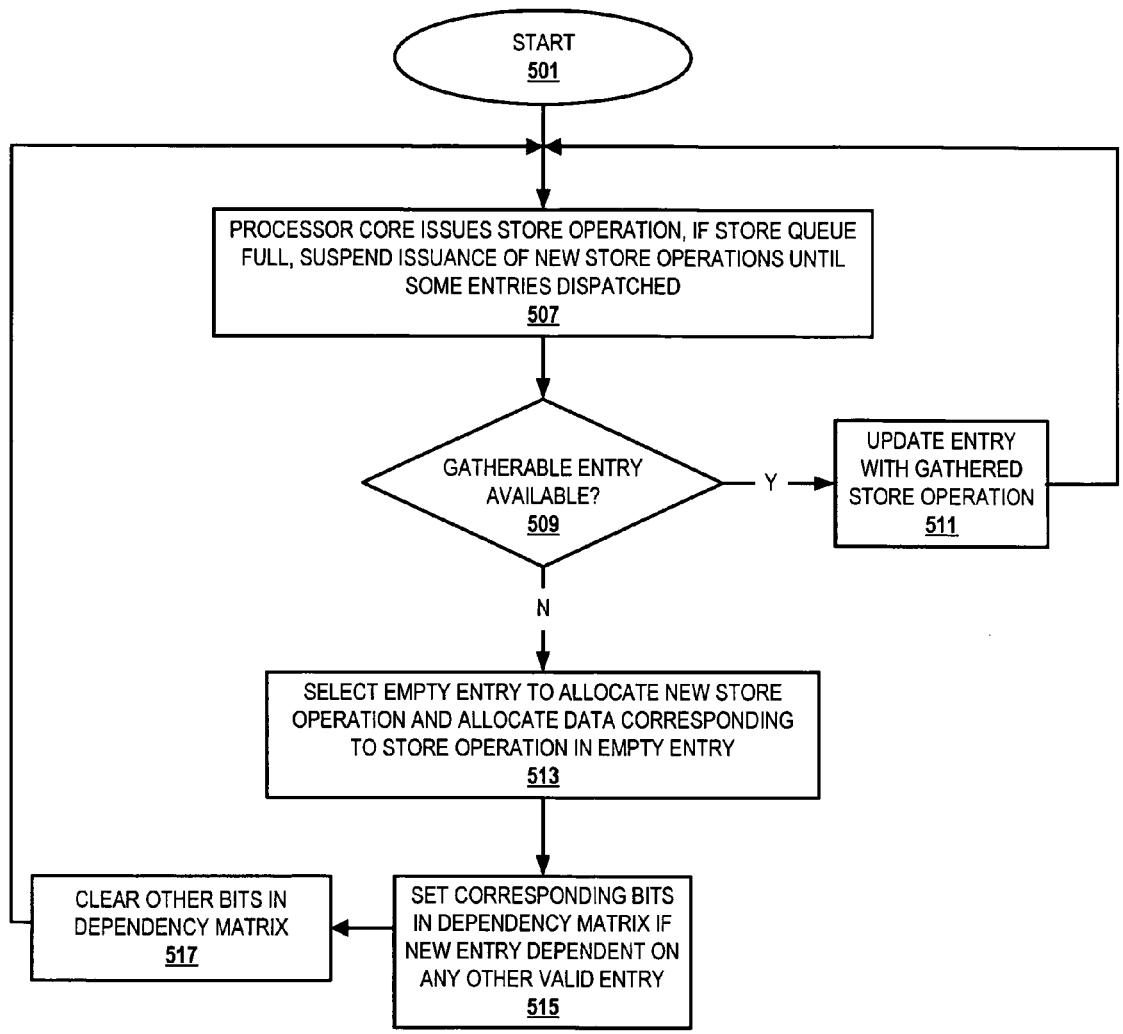
FIG. 5 is a high-level logical flowchart depicting an exemplary process in writing a new store queue entry in response to receiving a new store operation according to a preferred embodiment of the present invention.

FIG. 5 is a high-level logical flowchart depicting an exemplary process in writing a new store queue entry in response to store queue 407 receiving a new store operation from processor core 403 according to a preferred embodiment of the present invention. The process begins at step 501 and proceeds to step 507, which depicts processor core 403 issuing a store operation to store queue 407. However, if STQ controller 405 determines that store queue 407 is full, STQ controller 405 sends a message instructing processor core 403 to halt the sending of store operations until some entries have been dispatched by RC dispatch logic 419. The store operation is received at the store queue, and STQ controller 405 determines whether a previously existing entry (for the same cache line address) is currently available for gathering the store operation, as illustrated in step 509. Gathering of store operations involves a series of store operations writing to the same cacheline in the store queue that are absorbed by the store queue entry before the line is dispatched to the L2 cache, as previously described. If STQ controller 405 determines that an existing entry is gatherable for the new store operation, the process continues to step 511, which depicts STQ controller 405 updating the gatherable entry with data of the store operation. The process then returns to step 507 and continues in an iterative fashion.

Returning to step 509, if STQ controller 405 determines that a gatherable entry for the new store operation does not exist, the process continues to step 513, which illustrates an empty entry (or invalid, as indicated by valid bit field 417 associated with the selected entry) being selected by write select pointer 404 to allocate the new store operation. The new data, address, and byte enable data corresponding to the new store operation is inserted into the new entry by STQ controller 405. The process then continues to step 515, which depicts STQ controller 405 setting bits in dependency matrix 408 corresponding to valid entries in store queue 407 determined by STQ controller 405 to have a dependent relationship with the new entry (where the new entry is dependent on the other valid entries).

A new entry is dependent on another store queue entry if, among other things, the store operation characterized by the new entry requires an access to the same address as the other store queue entry or must be synchronized with the other store queue entry's store operation. The process then continues to step 517, which illustrates STQ controller 405 clearing the bits corresponding to entries that the new entry is not dependent. For example, as earlier described in conjunction with FIG. 4, if for a new store operation, write select pointer 404 updates store queue entry 0, and STQ controller 405 determines that entry 0 is dependent on entry 1, STQ controller 405 will enter a "1" into row 0, column 1 of dependency matrix 408 while entering a "0" in the rest of the columns in row 0, provided that entry 0 is not dependent on any other entry in store queue 407. The process returns to step 507 and proceeds in an iterative fashion.

Figure 6:
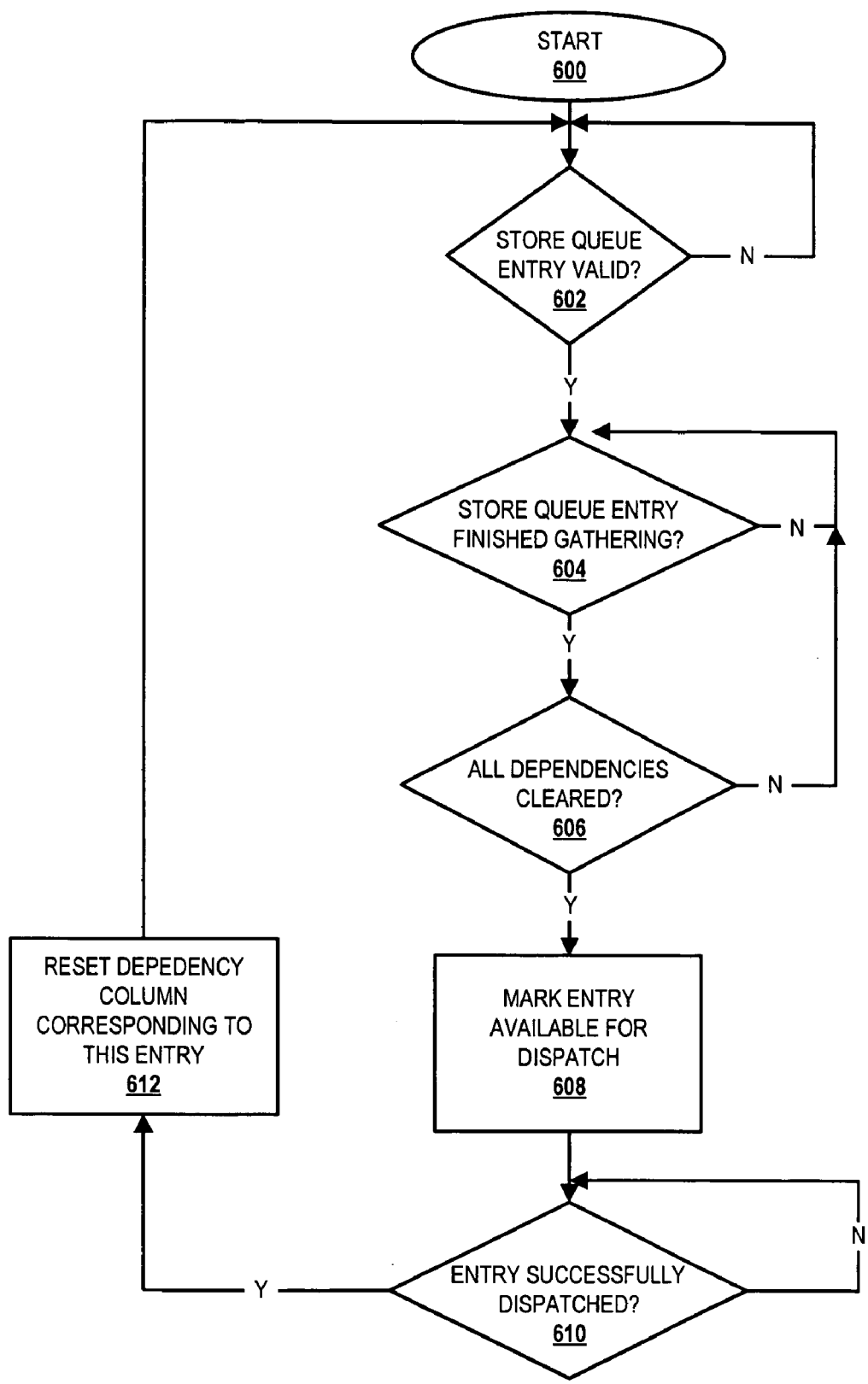
FIG. 6 is a high-level logical flowchart illustrating an exemplary process of determining whether a specific entry in the store queue is eligible for dispatch by RC dispatch logic according to a preferred embodiment of the present invention.

In reference now to FIG. 6, there is a high-level logical flowchart illustrating an exemplary method of determining whether a specific entry in store queue 407 is eligible for dispatch by RC dispatch logic 419 in accordance with a preferred embodiment of the present invention. The process depicted in FIG. 6 is run in parallel with all store queue entries. The process begins at step 600 and proceeds to step 602, which illustrates STQ controller 405 determining whether or not a particular store queue entry is valid. According to a preferred embodiment of the present invention, STQ controller 405 determines the validity of a particular entry by examining the contents of the associated valid bit field 417

Returning to step 602, if STQ controller 405 determines that the store queue entry is not valid, the process then returns to step 602 and proceeds in an iterative fashion.

Returning again to step 602, if STQ controller 405 determines that the store queue entry is valid, the process proceeds to step 604, which depicts STQ controller 405 determining whether the store queue entry has finished gathering. As previously described, the gathering of store operations involves a series of store operations writing to the same cache line being absorbed by the store queue entry before being dispatched to the RC machines. Those with skill in this art will appreciate that STQ controller 405 may utilize any method to determine if the entry has finished gathering associated store operation. For example, designers of data processing system 100 may specify a period of time required for the gathering of store operations into a specific entry. When this specified period has elapsed, STQ controller 405 will determine that the entry has completed gathering of enough store operations for dispatch.

If STQ controller 405 determines that the entry has not finished gathering associated store operations into the entry, the process iterates at step 604. However, if STQ controller 405 determines that the entry has finished gathering, the process continues to step 606, which illustrates STQ controller 405 determining whether or not all the dependencies associated with the store queue entry have been cleared. If all the dependencies associated with the entry have not been cleared, the process returns to step 604 and proceeds in an iterative fashion. However, if STQ controller 405 determines that all the associated dependencies for the entry have been cleared, the process continues to step 608.

Step 608 depicts STQ controller 405 marking the entry as available for dispatch. The process then continues to step 610, which illustrates STQ controller 405 determining whether the entry has been successfully dispatched. As previously discussed, when RC dispatch logic 419 has successfully dispatched an entry to an RC machine 421, RC dispatch logic 419 sends a "dispatch complete" signal to STQ controller 405. If the entry has not been successfully dispatched, the process iterates at step 610. However, if the entry has been successfully dispatched, the process continues to step 612, which illustrates STQ controller 405 resetting the dependency column corresponding to the recently successfully dispatched entry. For example, as previously discussed, if entry 0 is dependent on entry 1, a "1" in row 0, column 1 of dependency matrix 408 indicates this dependency. If entry 1 has been recently dispatched, row 0, column 1 and all other rows in column 1 of dependency matrix 408 will be updated with a "0" to remove the dependency of any entries in store queue 407 on the recently dispatched entry 1. The process then returns to step 602 and continues in an iterative fashion.

Figure 7:
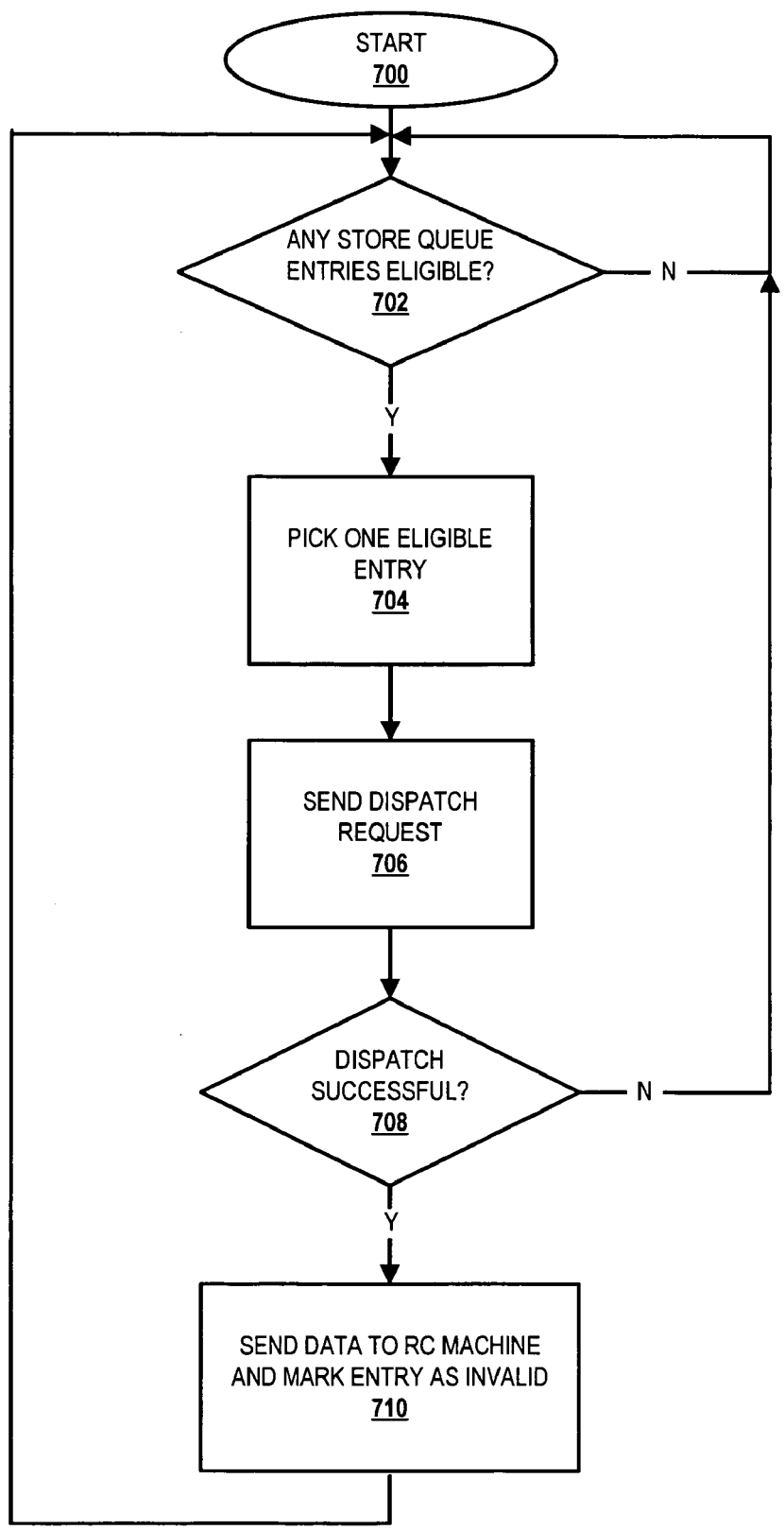
FIG. 7 is a high-level logical flowchart depicting the operation of arbitration logic within a STQ controller according to a preferred embodiment of the present invention.

FIG. 7 is a high-level logical flowchart depicting the operation of arbitration logic 406 to determine whether any entries in store queue 407 are eligible for dispatch by RC dispatch logic 417 according to a preferred embodiment of the present invention. The process begins at step 700 and continues to step 702 to determine if any store queue entries are eligible for dispatch. As previously discussed, a store entry is eligible for dispatch when (1) the valid bit is set; (2) STQ controller 405 has determined that the entry has completed gathering associated store operations; and (3) all dependencies related to the entry have been cleared (e.g., all values in the entry's associated row in dependency matrix 408 have been set to "0").

If arbitration logic 406 has determined that no entries in store queue 407 are available for dispatch, the process iterates at step 702. However, if at least one entry is available for dispatch, the process continues to step 704, which illustrates arbitration logic 406 selecting one eligible entry for dispatch. Those skilled in this art will appreciate that any selection algorithm may be utilized to select one eligible entry for dispatch. Some examples of commonly utilized algorithms are round-robin or random, but are not limited to these algorithms. Then, the process continues to step 708, which illustrates STQ controller 405 sending a dispatch request to RC dispatch logic 419. The process then continues to step 708, which depicts STQ controller 405 determining whether the dispatch of the entry was successful.

As previously discussed, RC dispatch logic 419 sends a "dispatch complete" signal to STQ controller 405 after a successful dispatch of a store operation associated with an entry in store queue 407. If STQ controller 405 determines that the dispatch of the entry is not successful, the process returns to step 702 and proceeds in an iterative fashion. If, however, STQ controller 405 determines that the dispatch of the entry was successful, the process continues to step 710, which illustrates RC dispatch logic 419 sending the data associated with the entry to an RC machine 421 for processing. STQ controller 405 marks the dispatched entry as invalid in associated valid bit field 417. The process then returns to step 702 and proceeds in an iterative fashion.

As disclosed, the present invention is a system and method for re-ordering store operations from a processor core to a store queue. When a store queue receives a new processor-issued store operation from the processor core, a store queue controller allocates a new entry in the store queue. In response to allocating the new entry in the store queue, the store queue controller determines whether or not the new entry is dependent on at least one other valid entry in the store queue. In response to determining the new entry is dependent on at least one other valid entry in the store queue, the store queue controller inhibits requesting of the new entry to the RC dispatch logic until each valid entry on which the new entry is dependent has been successfully dispatched to an RC machine by the RC dispatch logic.

While this invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitations, recordable-type media such as floppy disks or CD-ROMs and transmission-type media such as analog or digital communication links.

What is claimed is:

1. A processor chip that includes a processor core, a store queue (STQ) mechanism with a store queue, and Read-Claim (RC) dispatch logic, a method for re-ordering store operations from said processor core to said store queue, said method comprising:
    in response to receiving a new processor-issued store operation from said processor core, allocating a new entry in said store queue;
    in response to allocating said new entry, determining whether said new entry is dependent on at least one other valid entry in said store queue; and
    in response to determining said new entry is dependent on at least one other valid entry in said store queue, inhibiting processing of said new entry by said RC dispatch logic until each valid entry which said new entry is dependent has been processed by said RC dispatch logic.

2. The method of claim 1, wherein said inhibiting further includes:
    inhibiting requesting of said new entry by said RC dispatch logic until each valid entry which said new entry is dependent has been successfully dispatched by said RC dispatch logic.

3. The method of claim 1, further comprising:
    in response to receiving a processor-issued store operation from said processor core, determining whether a gatherable entry is available to absorb said processor-issue store operation in said store queue; and
    in response to determining said gatherable entry is available, gathering said store operation into said gatherable entry.

4. The method of claim 1, wherein said store queue (STQ) mechanism includes a dependency matrix, said inhibiting processing further includes:
    in response to determining said new entry is dependent on said at least one other valid entry in said store queue, setting at least one bit in said dependency matrix to indicate a dependency between said new entry and said at least one other valid entry in said store queue; and
    inhibiting processing of said new entry until said dependency matrix indicates that said new entry is not dependent on said at least one other valid entry in said store queue.

5. The method of claim 1, further comprising:
    in response to processing of said new entry by said RC dispatch logic, marking said new entry as invalid.

6. A processor, comprising:
    a processor core for issuing a new store operation;
    a store queue (STQ) mechanism with a store queue for allocating a new entry in said store queue, in response to receiving said new store operation from said processor core, wherein said store queue (STQ) mechanism determines whether said new entry is dependent on at least one other valid entry in said store queue; and
    a RC dispatch logic for processing said new entry only when each valid entry which said new entry is dependent has been processed by said RC dispatch logic.

7. The processor of claim 6, wherein said store queue (STQ) mechanism further includes:
    a store queue controller for inhibiting requesting of said new entry by said RC dispatch logic until each valid entry which said new entry is dependent has been successfully dispatched by said RC dispatch logic.

8. The processor of claim 6, wherein said store queue (STQ) mechanism further includes:
    logic for determining whether a gatherable entry is available to absorb said store operation in said store queue, in response to receiving a store operation from said processor core; and
    logic for gathering said store operation into said gatherable entry, in response to determining said gatherable entry is available.

9. The processor of claim 6, wherein said store queue (STQ) mechanism further includes:
    a dependency matrix for indicating a dependency between said new entry and said at least one other valid entry in said store queue, in response to determining said new entry is dependent on said at least one other valid entry in said store queue; and
    a store queue controller for inhibiting processing of said new entry by said RC dispatch logic until said dependency matrix indicates that said new entry is not dependent on said at least one other valid entry in said store queue.

10. The processor of claim 6, wherein said store queue (STQ) mechanism further includes:
    logic for marking said new entry is invalid, in response to processing of said new entry by said RC dispatch logic.

11. A data processing system, comprising:
    a plurality of processors, each of said plurality of processors further include:
        a processor core for issuing a new store operation;
        a store queue (STQ) mechanism with a store queue for allocating a new entry in said store queue, in response to receiving said new store operation from said processor core, wherein said store queue (STQ) mechanism determines whether said new entry is dependent on at least one other valid entry in said store queue; and
        a Read-claim (RC) dispatch logic for processing said new entry only when each valid entry which said new entry is dependent has been processed by said RC dispatch logic;

a system memory; and a system interconnect, coupling said system memory and said plurality of processors.

12. The data processing system of claim 11, wherein said store queue (STQ) mechanism further includes:

a store queue controller for inhibiting requesting of said new entry by said RC dispatch logic until each valid entry which said new entry is dependent has been successfully dispatched by said RC dispatch logic.

13. The data processing system of claim 11, wherein said store queue (STQ) mechanism further includes:

logic for determining whether a gatherable entry is available to absorb said store operation in said store queue, in response to receiving a store operation from said processor core; and logic for gathering said store operation into said gatherable entry, in response to determining said gatherable entry is available.

14. The data processing system of claim 11, wherein said store queue (STQ) mechanism further includes:

a dependency matrix for indicating a dependency between said new entry and said at least one other valid entry in said store queue, in response to determining said new entry is dependent on said at least one other valid entry in said store queue; and a store queue controller for inhibiting processing of said new entry by said RC dispatch logic until said dependency matrix indicates that said new entry is not dependent on said at least one other valid entry in said store queue.

15. The data processing system of claim 11, wherein said store queue (STQ) mechanism further includes:

logic for marking said new entry is invalid, in response to processing of said new entry by said RC dispatch logic.

16. A computer program product, emulating a processor chip that includes a processor core, a store queue (STQ) mechanism with a store queue, and Read-claim (RC) dispatch logic, a method for re-ordering store operations from said processor core to said store queue, said computer program product comprising:

instructions, stored in computer-readable storage media, in response to receiving a new processor-issued store operation from said processor core, for allocating a new entry in said store queue;

instructions, stored in computer-readable storage media, in response to allocating said new entry, for determining whether said new entry is dependent on at least one other valid entry in said store queue; and instructions, stored in computer-readable storage media, in response to determining said new entry is dependent on at least one other valid entry in said store queue, for inhibiting processing of said new entry by said RC dispatch logic until each valid entry which said new entry is dependent has been processed by said RC dispatch logic.

17. The computer program product of claim 16, wherein said instructions for inhibiting further includes:

instructions, stored in computer-readable storage media, for inhibiting requesting of said new entry by said RC dispatch logic until each valid entry which said new entry is dependent has been successfully dispatched by said RC dispatch logic.

18. The computer program product of claim 16, further comprising:

instructions, stored in computer-readable storage media, in response to receiving a processor-issued store operation from said processor core, for determining whether a gatherable entry is available to absorb said processor-issue store operation in said store queue; and instructions, stored in computer-readable storage media, in response to detennining said gatherable entry is available, for gathering said store operation into said gatherable entry.

19. The computer program product of claim 16, wherein said store queue (STQ) mechanism includes a dependency matrix, said instructions for inhibiting processing further includes:

instructions, stored in computer-readable storage media, in response to determining said new entry is dependent on said at least one other valid entry in said store queue, for setting at least one bit in said dependency matrix to indicate a dependency between said new entry and said at least one other valid entry in said store queue; and instructions, stored in computer-readable storage media, for inhibiting processing of said new entry until said dependency matrix indicates that said new entry is not dependent on said at least one other valid entry in said store queue.

20. The computer program product of claim 16, further comprising:

instructions, stored in computer-readable storage media, in response to processing of said new entry by said RC dispatch logic, marking said new entry as invalid.

* * * * *